(12) United States Patent
Hampsten

(10) Patent No.: US 6,260,802 B1
(45) Date of Patent: Jul. 17, 2001

(54) PNEUMATIC AIRBORNE EJECTION SYSTEM FOR AEROSPACE VEHICLES

(75) Inventor: Kenneth R. Hampsten, Albuquerque, NM (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 09/558,456

(22) Filed: Apr. 25, 2000

(51) Int. Cl.[7] .................................................. B64D 1/00
(52) U.S. Cl. ........................ 244/137.1; 244/49; 244/63; 89/1.817; 89/1.818
(58) Field of Search .................. 244/13, 46, 49, 244/63, 137.1, 3.24–3.3; 89/1.815–1.819

(56) References Cited

U.S. PATENT DOCUMENTS

| | | | |
|---|---|---|---|
| 2,737,411 | * | 3/1956 | Potter ................................... 244/130 |
| 2,977,853 | * | 4/1961 | Gehrkens et al. ................. 244/137.1 |
| 3,053,488 | * | 9/1962 | Cox, Jr. ................................ 244/130 |
| 3,056,335 | * | 10/1962 | Thieblot et al. ................... 244/137.1 |
| 3,135,161 | * | 6/1964 | Oyhus ................................. 89/1.818 |
| 3,209,929 | * | 10/1965 | Petersen et al. ................... 244/137.1 |
| 3,480,237 | * | 11/1969 | Appleby ............................. 244/130 |
| 4,040,334 | * | 8/1977 | Smethers, Jr. ..................... 89/1.818 |
| 4,209,147 | * | 6/1980 | Jones, Jr. ........................... 244/3.28 |
| 5,078,339 | * | 1/1992 | Lapidot .............................. 244/49 |
| 5,118,052 | * | 6/1992 | Calderon ............................ 244/49 |
| 5,615,847 | * | 4/1997 | Bourlett ............................. 244/3.28 |
| 6,056,237 | * | 5/2000 | Woodland ........................... 244/49 |

OTHER PUBLICATIONS

Hampsten, Kenneth R. and John M. Walker, "BladeRunner Aerospace Vehicle," AIAA Intl. Space Station Service Vehicles Conf., Jun. 26, 1999.

* cited by examiner

*Primary Examiner*—Galen L. Barefoot
(74) *Attorney, Agent, or Firm*—Kenneth E. Callahan

(57) ABSTRACT

An airborne pneumatic launch tube ejection system to described for launching an aerospace vehicle/payload into orbit. The system can be installed in a jet transport aircraft without requiring structural modifications.

4 Claims, 5 Drawing Sheets

Section A-A
Side View and Rear View

PNEUMATIC AIRBORNE EJECTION SYSTEM FOR AEROSPACE VEHICLES

STATEMENT OF GOVERNMENT INTEREST

The invention described herein may be manufactured and used by or for the Government for governmental purposes without the payment of any royalty hereon.

BACKGROUND OF THE INVENTION

1. Field of the Invention

The present invention is in the field of spacecraft aerospace vehicle systems, and in particular relates to a launching system from an airborne platform.

2. Description of the Prior Art

Airborne aerospace vehicle operations have a number of advantages over traditional ground-based launches. A much larger first stage booster with a concomitant increase in launch costs is necessitated by ground launches. An aircraft launch provides approximately 3,000 feet per second of equivalent velocity to orbit or about 10% of the total orbital delta-V requirement. The airborne launch point can readily be selected based on orbit and safety considerations.

Previous airborne launch concepts have used either underwing or under-fuselage attachments. These arrangements are limited by wing structural load limitations or by the available volume under the aircraft's fuselage. Other internally carried airborne concepts have relied on parachute extraction, which requires depressurizing the cabin and flying at low speed and altitude.

Pneumatic expulsion technologies have been employed for the past four decades to launch ballistic missiles from submerged submarines. The present invention incorporates similar technologies for the launch of an aerospace vehicle from an airborne platform. The specific invention is a modular airborne pneumatic launch tube system, which would independently eject an aerospace vehicle of appropriate size and mass from a military or commercial jet transport aircraft.

The "torpedo tube" aerospace vehicle launch concept provides an safe, low cost method of inserting an aerospace vehicle into an initial position of relatively high altitude (~35,000–40,000 feet), high subsonic Mach Number (M=0.8), and proper launch azimuth. The launch tube can accommodate multiple aerospace vehicle propulsion schemes, including solid propellants, liquid storable propellants, and cryogenic liquid propellants. Aircraft launch platforms enable open ocean launch, enhance covert operations, eliminate third party liability, and eliminate range support costs. The launch tube also serves as a means to ferry a dry (no propellant on-board) aerospace vehicle to any point on the globe prior to a mission. The modular nature of the launch tube system enables a standard military wide-body cargo jet to be utilized in two operating modes, to conduct space launch missions and to conduct routine cargo transport missions. The time estimated to retrofit to either mission is only 24 hours. No aircraft primary airframe modifications are required for this system. Only the cargo ramp door and the outer "petal" doors require modification, and they are not part of the flight structure.

SUMMARY OF THE INVENTION

The airborne pneumatic launch tube system can independently eject one or two space aerospace vehicles of appropriate size and mass from a commercial or military wide-body jet transport aircraft. The system consists of: a launch tube; a pneumatic expulsion system; a launch tube control system; a sabot for sealing and supporting the aerospace vehicle in the tube; and a frictionless air-jet levitation system for "floating" the booster in the tube at the time of loading and at launch. Non-structural modifications to the airplane include cutting a hole in the aft cargo doors to accommodate the after portion of the launch tube. An inflatable contoured bellows plug is used to maintain the aircraft's aerodynamic contour during flight. Deployable scissor wings attached to the aerospace vehicle maintain its essentially horizontal attitude after ejection. If the aerospace vehicle uses a cryogenic oxidizer such as Lox and a storable fuel such as kerosene, the fuel is stored in a separate tank that typically would be integral to the tube's lower support structure and transferred to the aerospace vehicle just prior to launch. Lox is loaded into the aerospace vehicle's internal booster/upper stage tanks on the ground, the tube muzzle door sealed and a vacuum pulled to insulate the vehicle's on-board cryogenic tank during flight, minimizing boil-off. Solid and liquid storable propellants are kept on-board the aerospace vehicle at all times.

The aerospace vehicle, with the necessary sabot sections, is loaded into the tube horizontally using the air levitation system. Propellants are transferred if the aerospace vehicle uses liquid propellants. The aft muzzle door is shut and the contoured bellows plug is inflated to cover the aft petal door cutout. The plane flies to the launch point and begins the ejection sequence. The tube interior pressure is equalized with the ambient pressure at altitude. The muzzle door and contoured bellows plug are deflated and retracted about 5 seconds before ejection and the air levitation system suspends the aerospace vehicle. The pneumatic expulsion system is activated supplying approximately 40 psig to eject the aerospace vehicle. It clears the tube in about 1.5 seconds, achieving a 3-g rearward acceleration. The aerospace vehicle is rolled 90 degrees, the scissor wings rotate into position, and the aerospace vehicle is ignited.

BRIEF DESCRIPTION OF THE DRAWINGS

The various features of novelty that characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DETAILED DESCRIPTION

Figure 1:
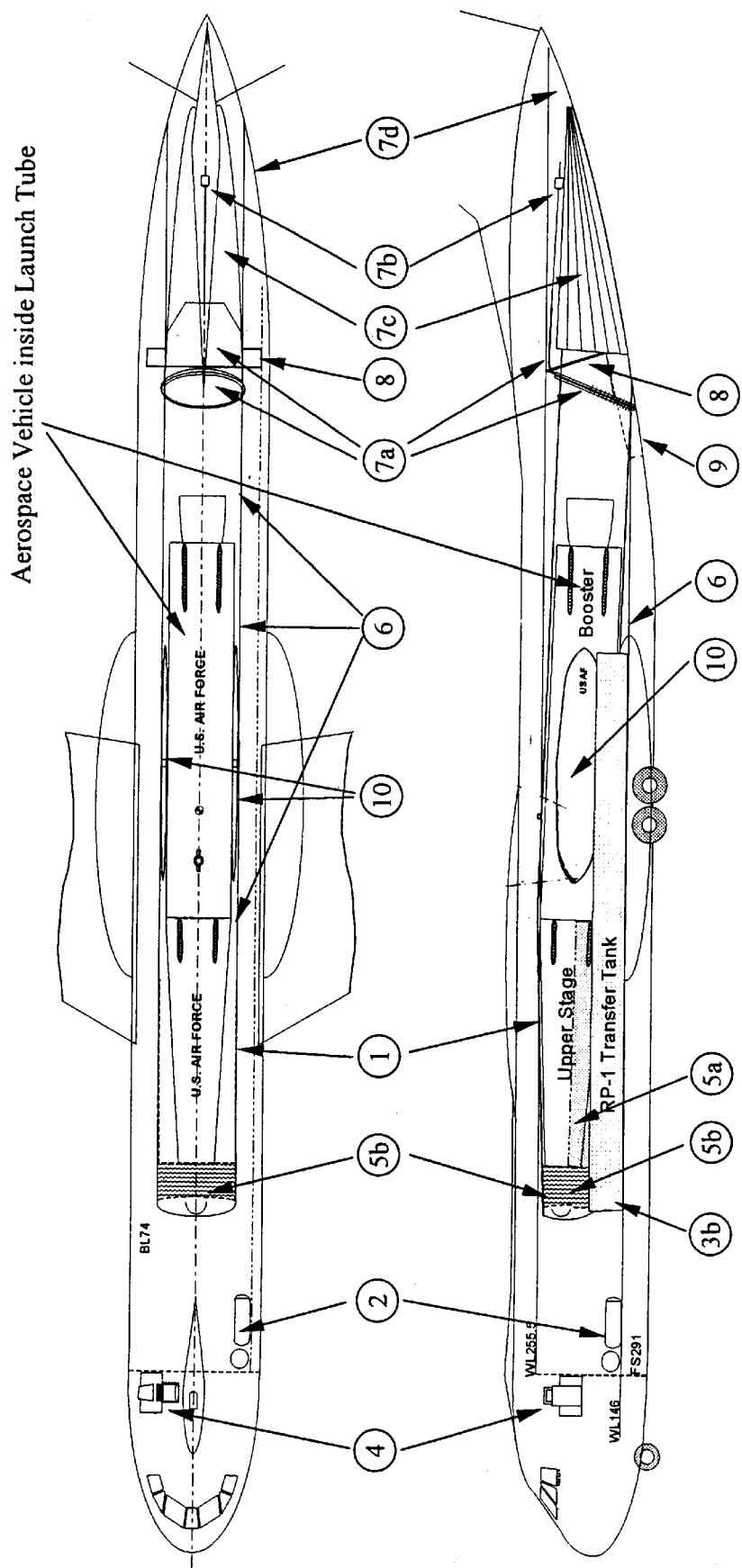
FIG. 1 is a side view and top view diagram of a C-141 containing the launch tube.

FIG. 1 shows a pneumatic launch tube containing an aerospace vehicle/spacecraft positioned inside the cargo bay of a large cargo plane. This exemplary embodiment in FIG. 1 uses a C-141B jet aircraft. The system shown consists of: a launch tube 1; a pneumatic expulsion system 2; a propellant storage and transfer system 3; a launch tube control system 4; a sabot for sealing and supporting the aerospace vehicle in the tube 5a, 5b; a frictionless air-jet levitation system for "floating" the booster in the tube at the time of loading and at launch 6; a tube muzzle door subsystem 7; and an inflatable contoured bellows plug 8. Also shown are modified cargo ramp doors 9 and the aerospace vehicle variable geometry counter rotating scissor-wing aerodynamic upper and lower lifting surfaces attached to the booster's fuselage 10. This system is for a aerospace vehicle using a cryogenic oxidizer and storable fuel.

Figure 2:
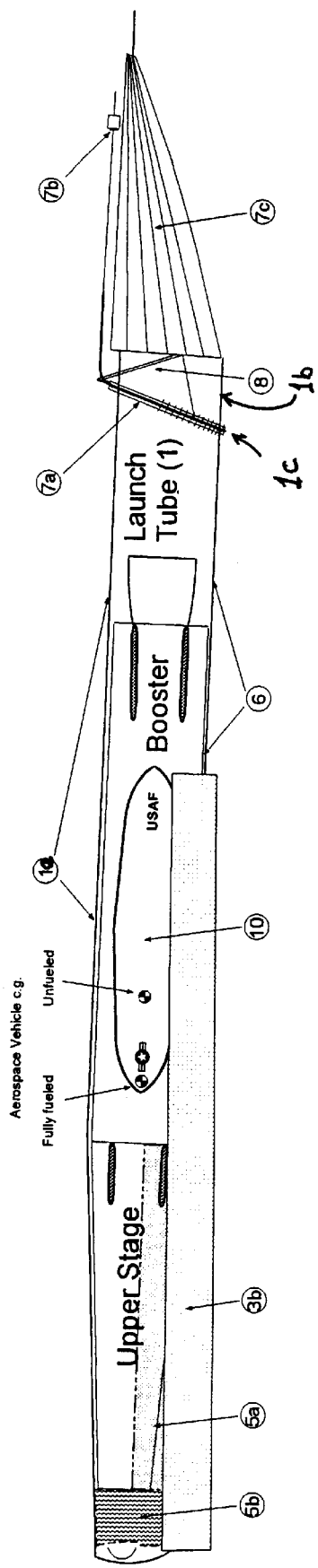
FIG. 2 is a diagram of the pneumatic launch tube.

The pneumatic launch tube 1 consists of a forward tube section 1a, an after tube assembly 1b, and a tube flange assembly 1c connecting the forward and aft sections, as shown in FIG. 2. The forward tube 1a is where the aerospace vehicle is stored in flight and where pneumatic forces are reacted during the expulsion process. The after tube 1b is a cantilevered structure open to the atmosphere that guides the aerospace vehicle through the aircraft's remaining unpressurized tail section. The tube flange assembly 1c supports the after tube's bending loads experienced when the aerospace vehicle exits the rear of the aircraft and within which the muzzle door 7a moves to seal the forward tube section.

The pneumatic expulsion subsystem 2 provides the pressure need to expel the aerospace vehicle from the tube. The high-pressure gas could be supplied by a solid rocket, such as used for submarine launched missiles, by high-pressure gas stored in a tank, or by a gas generator system, such as that described in U.S. Pat. No. 6,047,541. At launch, the gas is fed directly into the front end of the pneumatic tube.

Storable propellants can be transferred into the aerospace vehicle after it has been loaded into the pneumatic tube. Cryogenic propellants, however, require additional handling. Once the empty aerospace vehicle is loaded into the tube, a cryogenic oxidizer, such as Lox, is transferred to its aerospace vehicle propellant tank. A storable fuel, such as RP-1, is stored separately in a tank 3 external to the launch tube. This storage tank is located under the launch tube and, in addition, supplies structural support to the tube. The fuel is subsequently transferred to the aerospace vehicle just prior to launch. This arrangement maintains the fuel at ambient temperature prior to launch. For cryogenic propellants, the pneumatic tube is sealed and a vacuum pulled to insulate the cryogenic tank.

A PC derived portable computer system 4 is used for master control of all launch tube/vehicle sequencing operations. These include propellant transfers, launch tube evacuation, launch tube pressure equalization, muzzle door 7a/screw jack 7b operation, pneumatic expulsion system operation, air levitation system 6 operation, and inflatable contoured bellows plug 7c operation. It also handles monitoring operations, such as pressures, temperatures, and mass flows. It performs the launch countdown sequence, airborne telemetry data acquisition, and initiating flight termination operation if necessary.

The sabot 5 system (FIG. 1) supports those portions of the aerospace vehicle having a reduced diameter and acts as a tube pneumatic piston 5b for high expulsion efficiency. Typically, the spacecraft is contained within a conical fairing having a smaller diameter than the first stage of the aerospace vehicle. Upper stages may also have smaller diameters. The horizontal configuration of the aerospace vehicle requires the sabot support 5a system.

The bottom half of the launch tube has a false bottom, the inner surface of which is perforated by thousands of small holes. A pressurized air system 6 forces air through these holes to provide a distributed force (similar to an air hockey table) to levitate the aerospace vehicle on a thin film of air. This levitation system is used to assist the ground loading process to eliminate point loads into the aerospace vehicle.

It is also used just prior to and during the launch sequence to eliminate friction forces at expulsion. The source of pressurized air could be the high-pressure gas tank used in a gas generator pneumatic expulsion subsystem or a separate high-pressure storage tank.

Figure 3:
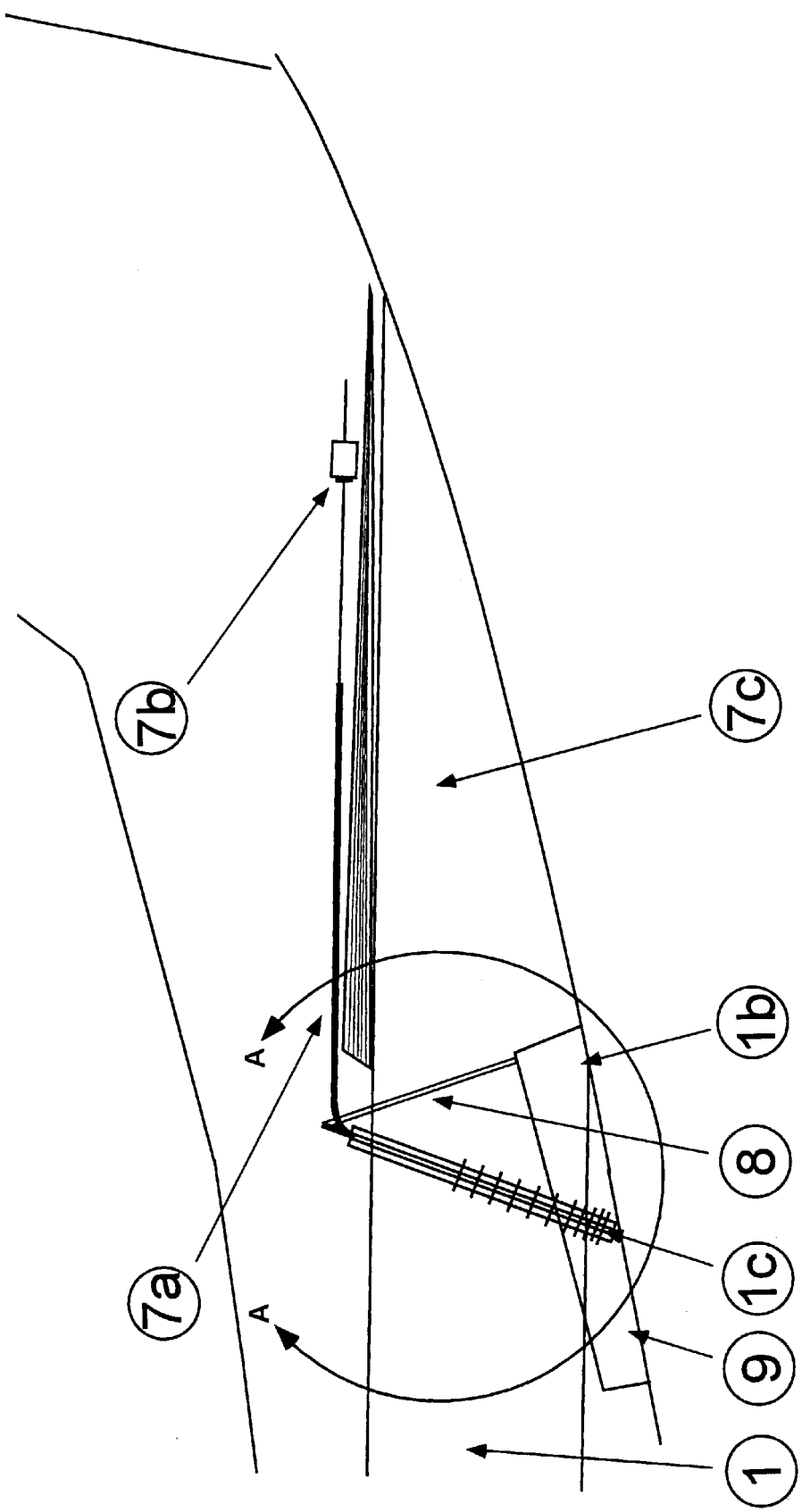
FIG. 3 is a side-view diagram of the muzzle door and inflatable contoured bellows plug.
Figure 4:
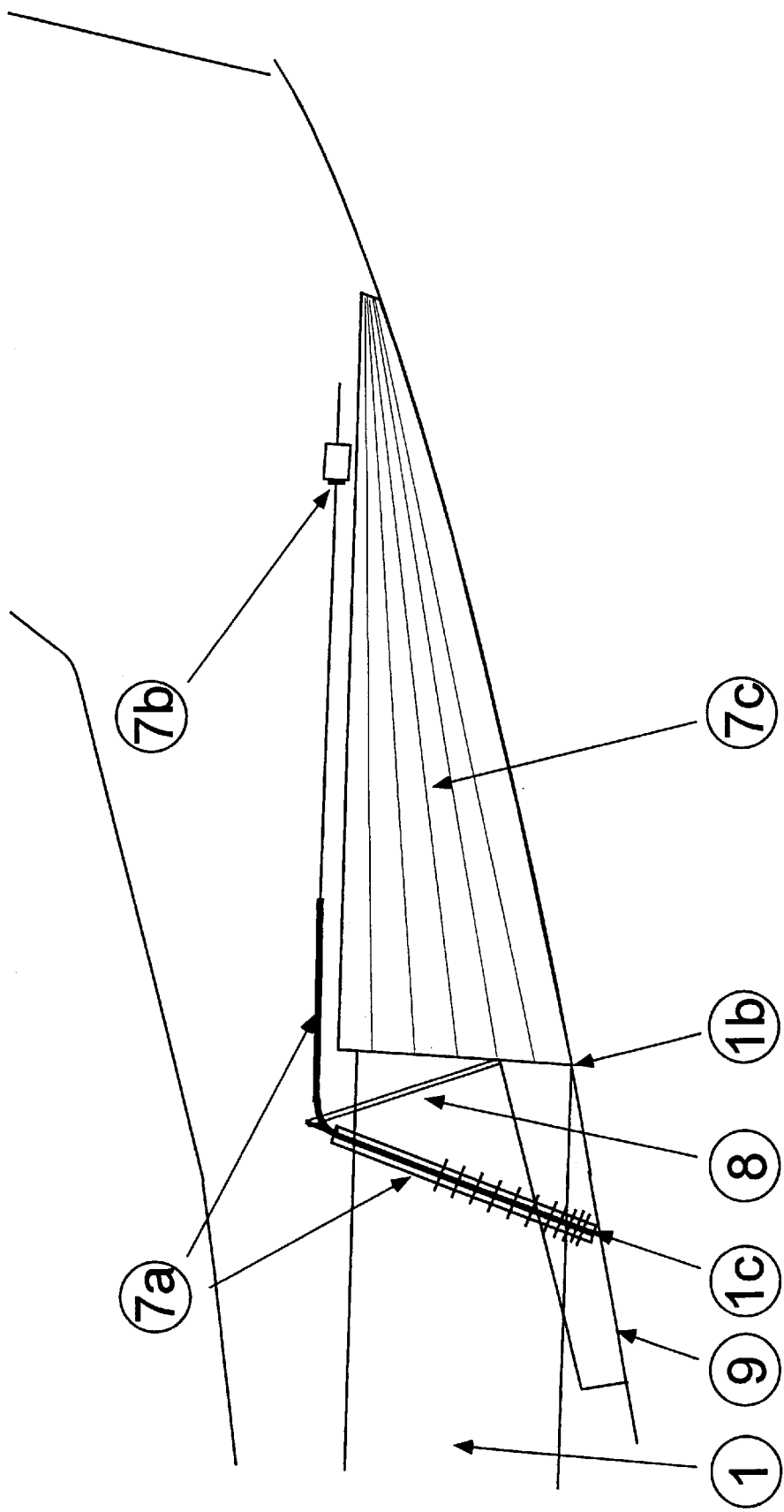
FIG. 4 shows the muzzle door in a closed position.
Figure 5:
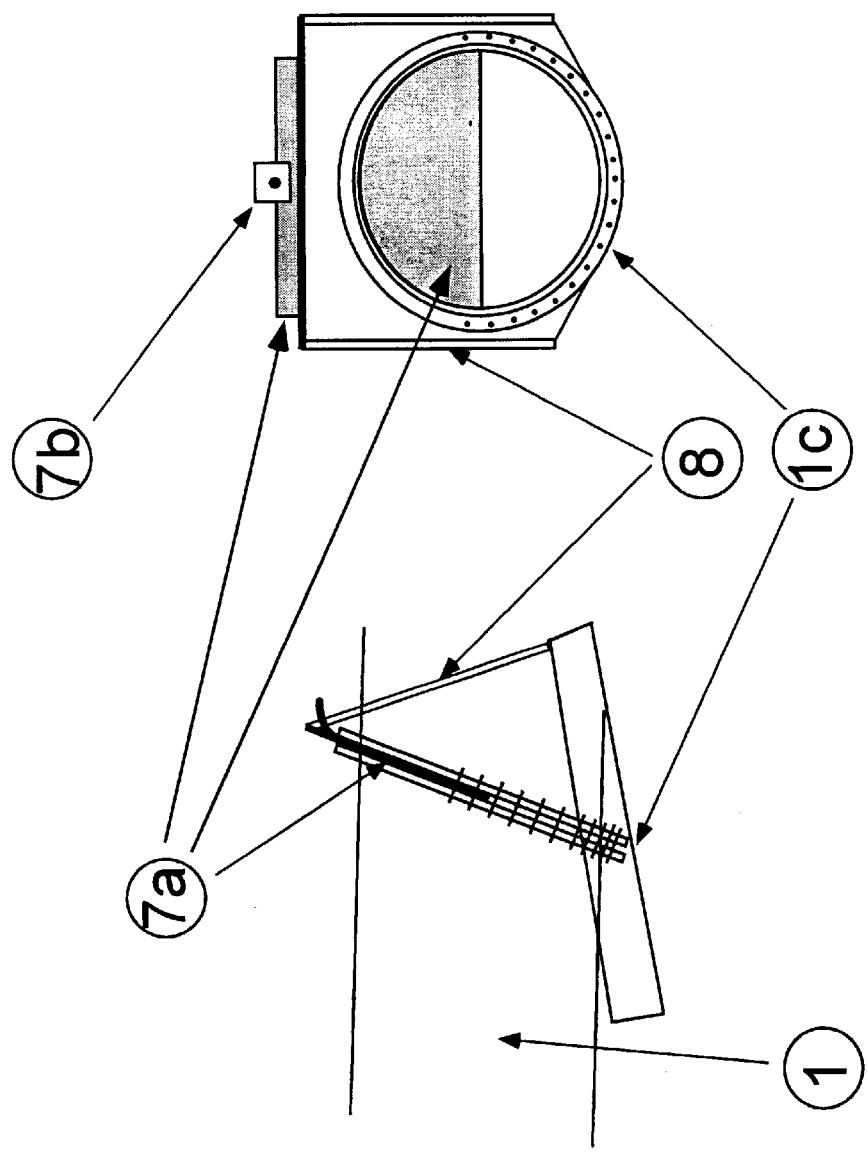
FIG. 5 shows the muzzle door is a partially open position in side and rear views.

A series of interlocked devices 7 are provided to rapidly open a large pathway for the translation of the aerospace vehicle from the forward tube to the open atmosphere during the launch sequence (See FIG. 3). A muzzle door 7a and a screw jack and actuator system 7b are utilized for aerospace vehicles using cryogenic propellants. The muzzle door 7a is a thin, flexible stainless steel membrane riding between rails and actuated by a screw jack 7b (similar in nature to a home automatic garage door). When in the closed position, as in FIG. 4, the muzzle door seals the aft end of the launch tube enabling a vacuum to be pulled within the tube. The screw jack 7b moves the muzzle door into the open position just prior to launch after the pressure inside the tube has been equalized with the ambient pressure. FIG. 5 shows side and aft views of the muzzle door in a partially open position. The muzzle door and actuator system are not used for aerospace vehicles employing storable propellants.

The original exterior cargo doors, such as those at the aft end of the C-141B plane, are modified by cutting out a hole to accommodate the after portion of the launch tube 1b penetration. These modified petal doors remain locked and never articulate open during launch operations. An inflatable contoured bellows plug 7c is a nonstructural inflatable/deflatable device. When inflated it fills the hole in the petal doors and preserves the aircraft's external aerodynamic contour. It is inflated on the ground and remains inflated during the pre-launch flight. It is deflated and retracted about 5 seconds before the launch and then re-inflated immediately after aerospace vehicle ejection.

The aft cabin to launch tube pressure seal 8 is a replacement for the original C-141 B cargo bay pressure bulkhead seal, designed to accommodate the launch tube. The seal is designed to use existing pressure seal bulkhead hinge and sealing surfaces located inside the C-141B fuselage. Other modifications of this type would be required for other cargo aircraft to maintain aircraft cabin pressure during flight. The cargo ramp door 9 would also need to be modified accommodate the launch tube.

After ejection, the aerospace vehicle will be essentially in a horizontal configuration. Maintaining this attitude using the aerospace vehicle's attitude control system would require very large control moments and consequently reduce its payload weight to orbit capability. To overcome this problem, variable geometry, counter-rotating scissor-wing aerodynamic upper and lower lifting surfaces 10 are attached to the booster's fuselage. The wings are rotated to the centerline in the stowed configuration with the axis of rotation aligned with the aerospace vehicle's yaw axis (the airplane's pitch axis). Consequently, the aerospace vehicle must be rolled 90 degrees after ejection for the wings, once deployed, to maintain the aerospace vehicle's pitch angle. The scissor-wings are subsequently rotated to the flight position with approximately a 30-degree sweep angle.

Aerospace vehicles using storable propellants simplify the airborne launch system configuration and the operational sequence. The launch tube is installed in the cargo airplane with the previously discussed modifications to the aft doors and loading ramp. The aerospace vehicle, with the necessary sabot sections, is loaded into the tube horizontally using the air levitation system. Propellants are loaded into the aerospace vehicle tanks. The aft doors are shut and the contoured bellows plug is inflated. The plane flies to the launch point and the ejection sequence begins. The tube interior pressure is equalized throughout the flight with the ambient pressure. The contoured bellows plug is deflated and retracted about 5 seconds before ejection and the air levitation system suspends the aerospace vehicle. The pneumatic expulsion system is activated supplying approximately 40 psig to eject the aerospace vehicle. It clears the tube in about 1.5 seconds, achieving a 3-g rearward acceleration. The aerospace vehicle is rolled 90 degrees and the scissor wings rotate into position. The aerospace vehicle is ignited. An aerospace vehicle using solid propellants would follow the same sequence, except that the propellants would already be in the aerospace vehicle prior to loading.

Aerospace vehicles using cryogenic propellants require some additional equipment and steps. The aft end of the tube needs a muzzle door and system capable of moving it into a closed position sealing the tube and into an opened position, clearing the tube path for ejection. The tube is loaded with the aerospace vehicle on the ground using the air levitation system. The storable fuel is loaded into a tank exterior to the launch tube. The cryogenic oxidizer, e.g., Lox, is transferred to the oxidizer tank. The muzzle door is closed. A vacuum is pulled in the tube creating in effect a dewar flask to insulate and minimize the boil off of the oxidizer. The aft doors are shut and the contoured bellows plug is inflated. The plane flies to the launch point and the ejection sequence begins. The tube interior pressure is equalized with the ambient pressure. The fuel is transferred into the aerospace vehicle fuel tank. The remaining sequence is the same as that described above.

The pneumatic launch tube system can be adapted to a number of aerospace vehicles with the tube diameter being somewhat larger than the maximum aerospace vehicle diameter. Sabot material would be adjusted to the aerospace vehicle's contour.

An aerospace vehicle could be launched with respect to the aircraft's centerline, either forward or aft. Alternatively, two aerospace vehicles could be launched in an aft facing parallel tube arrangement (ala double barrel shotgun) or in a tandem forward and aft facing tube configuration. Multi-tube arrangements would require a wide-body cargo jet such as the C-17, C-5A, or B747.

I claim:

1. An airborne aerospace vehicle launch system comprised of:
   a. a pneumatic launch tube positioned in an airplane cargo bay containing an aerospace vehicle/payload system, said aerospace vehicle employing storable propellants;
   b. modified airplane cargo doors whereby said launch tube extends unobstructed through said modified doors;
   c. an inflatable/deflatable contoured bellows plug for filling the aft end of said launch tube, thereby maintaining the aircraft's exterior aerodynamic mold lines;
   d. a sabot for sealing and supporting said aerospace vehicle/payload system within said tube;
   e. a source of high pressure gas capable of expelling said aerospace vehicle from said tube;
   f. a jet-air levitation system for floating said aerospace vehicle in said tube at the time of loading the aerospace vehicle into the tube and at the time of ejecting the aerospace vehicle from the tube;
   g. a variable geometry, scissor-wing aerodynamic upper and lower lifting surface attached to said aerospace vehicle capable of being stowed in said tube prior to launch and deployed subsequent to launch; and
   h. computer means for monitoring and sequencing operations of said airborne satellite aerospace vehicle launch system.

2. The airborne aerospace vehicle launch system of claim 1, wherein said high-pressure gas source is a gas generator.

3. An airborne aerospace vehicle launch system comprised of:
   a. a pneumatic launch tube positioned in an airplane cargo bay containing an aerospace vehicle/payload system, said aerospace vehicle employing a cryogenic oxidizer and a storable fuel;
   b. modified airplane cargo doors whereby said launch tube extends unobstructed through said modified doors;
   c. an inflatable/deflatable contoured bellows plug for filling the aft end of said launch tube, thereby maintaining the aircraft's exterior aerodynamic mold lines;
   d. a tank external to said launch tube to hold said aerospace vehicle's storable propellant;
   e. means to transfer said storable propellant to said aerospace vehicle prior to launch;
   f. a muzzle door located near the aft end of said launch tube capable of being positioned to close off and seal said tube and of being rapidly withdrawn so said tube is not obstructed at time of launch;
   g. a pressure maintenance system capable of pulling a vacuum from said launch tube when sealed by said muzzle door and capable of equalizing the pressure of said tube with the ambient pressure;
   h. a sabot for sealing and supporting said aerospace vehicle/payload system;
   i. a source of high pressure gas capable of expelling said aerospace vehicle from said tube;
   j. a jet-air levitation system for floating said aerospace vehicle in said tube at the time of loading the aerospace vehicle into the tube and at the time of ejecting the aerospace vehicle from the tube;
   k. a variable geometry, scissor-wing aerodynamic upper and lower lifting surface attached to said aerospace vehicle capable of being stowed in said tube prior to launch and deployed subsequent to launch; and
   l. computer means for monitoring and sequencing operations of said airborne aerospace vehicle launch system.

4. The airborne aerospace vehicle launch system of claim 3, wherein said high-pressure gas source is a gas generator.

* * * * *